Patented Jan. 23, 1934

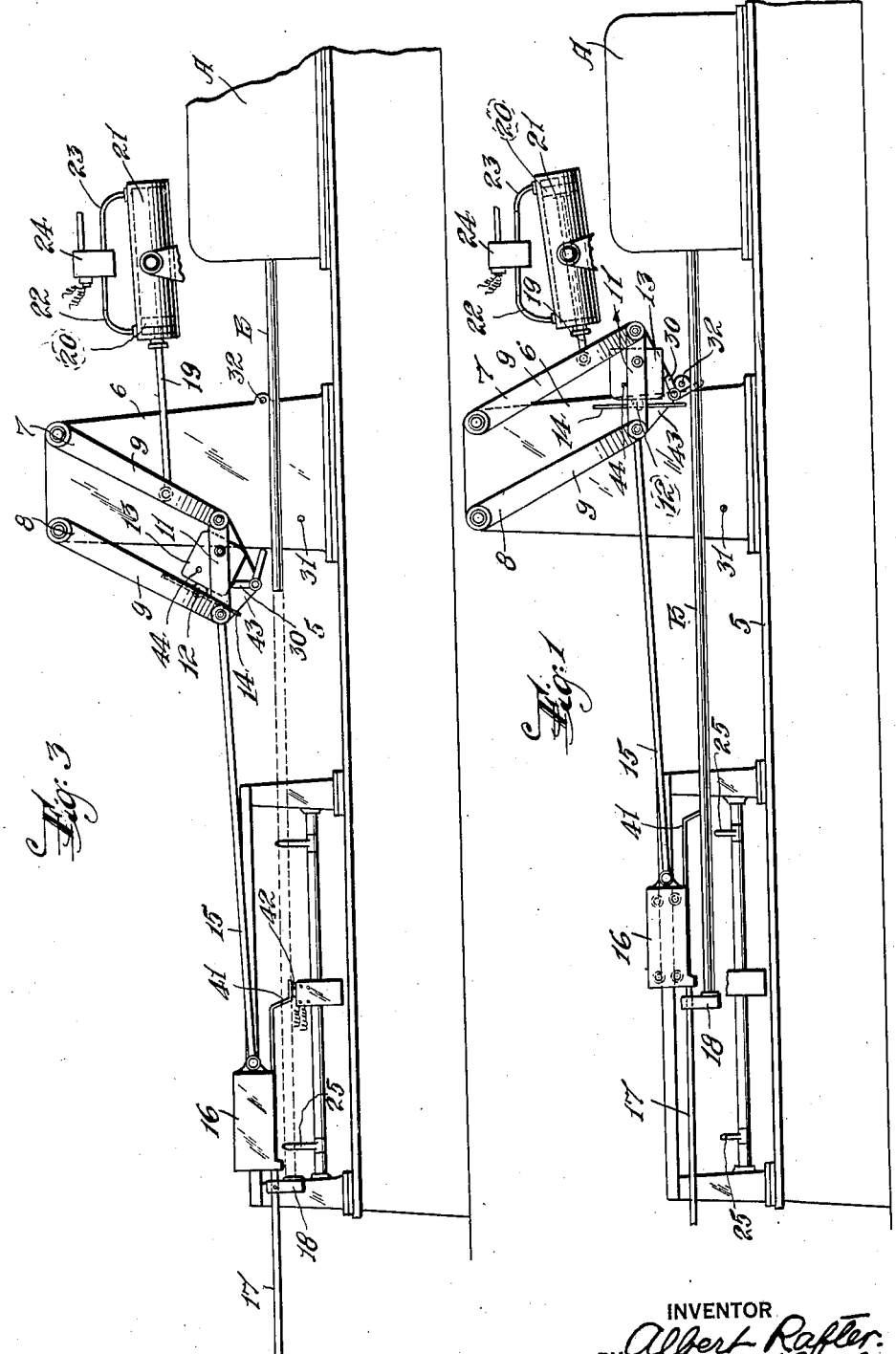

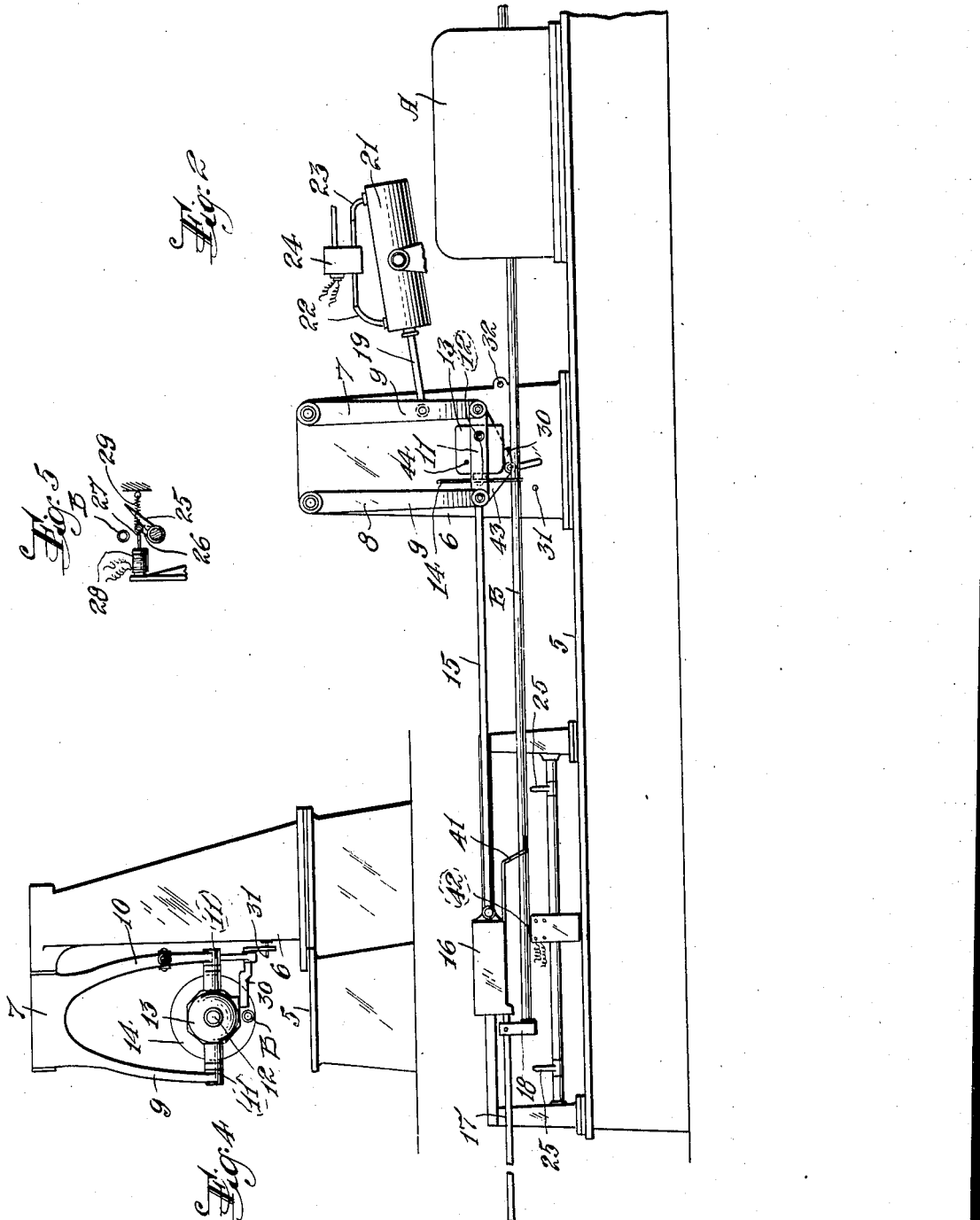

1,944,718

UNITED STATES PATENT OFFICE 1,944,718

DEVICE FOR SEVERING CONTINUOUSLY MOVING ARTICLES INTO DESIRED LENGTHS

Albert Rafter, Belleville, N. J., assignor to Rafter Machine Company, Belleville, N. J., a partnership composed of Albert Rafter and John C. Rafter, Jr.

Application October 27, 1932. Serial No. 639,774

6 Claims. (Cl. 164—61)

This invention relates to devices for severing continuously moving rods, tubes, and other articles, into desired lengths, without interfering with the movement of the article during the severing operation.

It is a common practice to form tubing and other metal shapes by passing cold metal sheets between a series of die rolls, and it is desirable that the metal be continuously moved through the forming machine without necessitating intermittent stopping of the machine to cut the tubing or other shapes into desired length. Heretofore, attempts have been made to sever continuously moving tubing and the like by means of cutting devices mounted on trucks traveling on tracks parallel to the moving tubing; but such severing devices are objectionable in that their operation is not smooth, and they are subjected to severe jars and shock, necessitating frequent repair and renewing of the cutting or severing devices. Similar other expedients heretofore used have been found objectionable in that they are all subjected to shock and excessive strains, since the cutting action is transverse to the movement of the article being cut; and when metal tubing and the like is cut, it is obvious that a considerable transverse force must be exerted.

It is therefore, an object of this invention to provide a device for severing metal tubing and other metal shapes, which are continuously moving, into desired lengths, without shocks or excessive strains upon the cutting tool, the device being freely movable to allow the cutting tool to be moved by and follow the movement of the metal tubing being severed.

A further object is the provision of a device for severing continuously moving rods, tubes, or other shapes, which device is moved by the article itself in the direction in which the article moves during the cutting operation.

A further object is the provision of novel means to throw a cutting device to an out of the way position immediately after severing a length of tubing or the like, and to return the device to a cutting position at the proper time to sever another length of tubing.

These and other advantageous objects, which will later appear, are accomplished by the simple and practical construction and arrangement of parts hereinafter described and exhibited in the accompanying drawings, forming part hereof, and in which:

Fig. 1 is a side elevational view showing the cutter swung back to a position ready for the severing operation, Fig. 2 is a similar view of my device showing the cutter in a severing position, Fig. 3 is a side elevational view of another position of the cutter, after the severing operation, Fig. 4 is an end elevational view of the device, and Fig. 5 is a fragmentary side view of a device for throwing a length of tubing out of the way after it has been severed.

Referring to the drawings, in Fig. 1 is shown diagrammatically a machine A, by means of which long metal sheets are formed into metal tubing or other shapes, the metal moving through the machine at a rate of 20 feet to 300 feet per minute. After the tubing B leaves the machine A, it travels over a platform 5, which has attached thereto a bracket 6 which pivotally supports a pair of members 7, 8, each of which is provided with spaced downwardly extending arms 9, 10 and the arms being at all times parallel and arms 9—9 and 10—10 being pivotally connected to links 11.

Pivotally supported by links 11 is an electric motor 13 having a stop pin 44 and having a shaft 12, to which is fixed a circular saw 14, or an equivalent cutting or severing tool. The arm 9 is pivotally connected to a rod 15 which is pivotally connected to a block 16, the latter being slidably mounted on the platform. The block 16 has attached thereto a rod 17 on which is mounted an adjustable depending stop 18, which can be fixed in adjusted positions on the rod 17.

Another arm 10 is connected to a rod 19 attached to a piston 20 in a cylinder 21. Tubes 22, 23, communicate with the cylinder on both sides of the piston and the tubes are connected to a two way valve 24, which in turn is connected to a source of compressed air.

In operation, the valve is opened to direct air through tube 23 to cause the piston to swing the arms and cutter in the direction of movement of the tubing B. The piston merely gives the arms 9, 10, an impulse to cause them to swing, after which the valve 24 is closed. As the arms swing, the cutter 14 moves downward into cutting engagement with the tubing. In the meantime, the end of the tubing has engaged the stop 18 and carries the stop with it, (see Fig. 1). The stop 18, being moved at the same speed as the tubing, gives a similar speed and movement to the rod 15 and to the arms 9, 10, etc., and to the cutter 14. It will, therefore, be seen that the cutter 14 is now carried by and moves at the same speed as the tubing during the cutting operation, which obviously prevents abrupt shocks or jars or excessive strains due to variations in speed. Also, the weight of the motor and the cutter is borne by the tubing to a certain degree thus facilitating the cutting action.

Mounted on the platform 5, alongside of the tubing is a lever (see Fig. 5) having arms 25 which are adapted to bear against the tubing, and an arm 26 which is connected to the plunger 27 of an electromagnet 28. A tension spring 29 normally moves the lever so that the arms 25 are free of the tubing. When a desired length of tubing has been severed, a bar 41 carried by the block 16 bears upon a button 42 to close an electrical circuit to energize the electromagnet and to pull the plunger 27 into the solenoid thereof, to cause the arms 25 to bear against and push the severed length of tubing off of the platform.

After the cutter 14 has severed a desired length of tubing, the arms 9, 10, etc., continue to swing in the direction of movement of the tubing for an instant, during which time a cam arm 30 pivoted to a plate 43 carried by the link 11 and bearing against the underside of the motor strikes a pin 31 projecting from the platform, which action causes a rotation of the cam arm 30 to raise the motor, so that the cutter will not engage the tubing on the return movement. Compressed air is then allowed to enter tube 22 to move the piston to the right, (Figs. 1 and 2) to return the arms to their starting position. As the motor moves back, the cam arm 30 strikes another pin 32 which moves the arm 30 to its normal position to allow the cutter to engage the tubing B.

From the above description, it will be seen that I have provided an effective device for severing metal tubing or similar shapes without placing excessive and damaging stresses upon the cutter, at the same time enabling a clean and well defined cut.

While I have described above, the cutter 14 as being a saw, it is to be understood that the cutter may be a circular knife or any type of cutting or severing device; the essential feature of my invention being the provision of a severing device which travels in an arcuate path so that the axis of said device is in a plane substantially parallel to the plane in which the article being severed moves.

It is obvious that my invention may be applied for severing rods of any material, and is not confined to the cutting of metal articles.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described my invention, what I claim as new and desire to secure by Letters Patent, is:

1. A device for severing continuously moving metal tubing into desired lengths, comprising a platform upon which the tubing moves, a bracket positioned adjacent the platform, a frame formed from two parallelograms having their links pivotally connected, a cutter supported by the frame, means to swing the frame in a plane substantially parallel to the plane in which the tubing moves to bring the cutter into cutting engagement with the tubing, and means to cause the cutter and tubing to move together at the same speed during the cutting operation.

2. A device for severing continuously moving metal articles into desired lenths, comprising a rotating cutter transverse to the article being severed and having its axis in substantially the same plane as the article, a pivotally supported frame upon which the cutter is mounted, means to swing the frame to bring the cutter into cutting engagement with the article being severed, and means to cause the cutter to move with the article at the same speed during the cutting operation.

3. A device for severing continuously moving articles, comprising a rotating severing device arranged to act transversely to the movement of the article, means to swing the severing device in an arcuate path so that the axis of said device is in a plane substantially the same as the plane in which the article moves, and means to cause the severing device and the article to move together at the same speed during the severing operation.

4. A device for severing continuously moving articles, comprising a rotating severing device arranged to act transversely to the movement of the article, means to swing the severing device in an arcuate path so that the axis of said device is in a plane substantially the same as the plane in which the article moves, and means to cause the severing device and the article to move together at the same speed during the severing operation, and means to move the severing device to an out-of-the-way position after each severing operation until the severing device has been swung back into position to begin another severing operation.

5. A device for severing continuously moving articles, comprising a rotating severing device arranged to act transversely to the movement of the article, means to swing the severing device in an arcuate path so that the axis of said device is in a plane substantially the same as the plane in which the article moves, and means to cause the severing device and the article to move together at the same speed during the severing operation, and means to move the severed portion of the article out of the path of the continuously moving article to enable the severing of another length from the article.

6. A device for severing continuously moving metal articles into desired lengths, comprising a rotating cutter transverse to the article being severed and having its axis in substantially the same plane as the article, a pivotally supported frame upon which the cutter is mounted, means to swing the frame to bring the cutter into cutting engagement with the article being severed, a stop rod pivotally connected to the frame, and a stop depending from the rod, the moving article engaging the stop to cause the cutter and article to move together at the same speed during the cutting operation.

ALBERT RAFTER.